(12) United States Patent
LaGuardia et al.

(10) Patent No.: US 10,994,354 B2
(45) Date of Patent: *May 4, 2021

(54) SLITTED SANDWICH INSULATED ARC SAW BLADE HAVING A TRANSLATIONAL RAIL ASSMBLY AND DIRECT COUPLING TO A ROTATIONAL PIVOT PIN

(71) Applicant: Arc Saw Technologies, LLC, Sanibel, FL (US)

(72) Inventors: Thomas S. LaGuardia, Sanibel, FL (US); Richard Simoneau, Sandy Hook, CT (US)

(73) Assignee: Arc Saw Technologies, LLC, Sanibel, FL (US)

( * ) Notice: Subject to any disclaimer, the term of this patent is extended or adjusted under 35 U.S.C. 154(b) by 243 days.

This patent is subject to a terminal disclaimer.

(21) Appl. No.: 16/027,140

(22) Filed: Jul. 3, 2018

(65) Prior Publication Data

US 2019/0039160 A1 Feb. 7, 2019

Related U.S. Application Data

(63) Continuation of application No. 15/153,709, filed on May 12, 2016, now Pat. No. 10,014,084.

(60) Provisional application No. 62/160,250, filed on May 12, 2015.

(51) Int. Cl.
| | | |
|---|---|---|
| *B23K 9/013* | (2006.01) |
| *G21D 1/00* | (2006.01) |
| *B23K 9/23* | (2006.01) |
| *B23D 45/12* | (2006.01) |
| *B23D 59/00* | (2006.01) |
| *B23D 61/02* | (2006.01) |
| *B23K 35/02* | (2006.01) |
| *B23K 101/06* | (2006.01) |

(Continued)

(52) U.S. Cl.
CPC .......... *B23K 9/0135* (2013.01); *B23D 45/128* (2013.01); *B23D 59/006* (2013.01); *B23D 61/025* (2013.01); *B23K 9/23* (2013.01); *B23K 35/0211* (2013.01); *G21D 1/003* (2013.01); *B23K 2101/06* (2018.08); *B23K 2101/12* (2018.08); *B23K 2103/04* (2018.08); *B23K 2103/05* (2018.08); *G21D 1/00* (2013.01); *Y02E 30/30* (2013.01)

(58) Field of Classification Search
CPC ........... A01F 29/06; B23H 1/00; B23K 37/02; B23B 47/00
See application file for complete search history.

(56) References Cited

U.S. PATENT DOCUMENTS

| | | |
|---|---|---|
| 2,015,514 A | 9/1935 | Ehrhart |
| 2,059,236 A | 11/1936 | Holslag |
| 2,355,838 A | 8/1940 | Young et al. |

(Continued)

OTHER PUBLICATIONS

Reactor Pressure Vessel. Reactor Pressure Vessel Status Report, U.S. NRC. NUREG-1511. (Year: 1994).*

(Continued)

*Primary Examiner* — Christopher M Koehler
*Assistant Examiner* — Spencer H. Kirkwood
(74) *Attorney, Agent, or Firm* — RowanTree Law Group, PLLC; Carson C. K. Fincham (57) ABSTRACT

Arc saw blades and systems and methods for segmenting components utilizing improved arc saw blades.

7 Claims, 8 Drawing Sheets

(51) Int. Cl.
   *B23K 101/12* (2006.01)
   *B23K 103/04* (2006.01)

(56) References Cited

U.S. PATENT DOCUMENTS

| | | |
|---|---|---|
| 2,548,314 A | 11/1949 | Kinney, Sr. |
| 4,243,862 A | 1/1981 | Wetzels |
| 4,399,344 A | 8/1983 | Schlienger et al. |
| 4,401,875 A | 8/1983 | Schlienger et al. |
| 4,463,242 A | 7/1984 | Schlienger et al. |
| 4,510,368 A | 4/1985 | Schlienger et al. |
| 4,594,774 A | 6/1986 | Barker |
| 4,608,477 A | 8/1986 | Deichelbohrer |
| 5,802,947 A | 9/1998 | Ward, Jr. |
| 5,819,619 A | 10/1998 | Miller |
| 5,951,888 A * | 9/1999 | Oakley .................. H05H 1/34 219/119 |
| 6,203,112 B1 | 3/2001 | Cook |
| 6,459,748 B1 | 10/2002 | Everett |
| 10,014,084 B2 * | 7/2018 | LaGuardia ............ G21D 1/003 |
| 2002/0124707 A1 | 9/2002 | Izard |
| 2011/0000475 A1 * | 1/2011 | Baratta ................ B23D 61/025 125/15 |
| 2011/0094956 A1 | 4/2011 | Marchand |
| 2012/0215220 A1 * | 8/2012 | Manzo ............... A61B 18/1482 606/46 |

OTHER PUBLICATIONS

Office Action for U.S. Appl. No. 15/153,709 dated Dec. 13, 2016; 24 pps.
Office Action for U.S. Appl. No. 15/153,709 dated May 12, 2017; 38 pps.
Final Office Action for U.S. Appl. No. 15/153,709 dated May 17, 2017; 38 pps.
Notice of Allowance for U.S. Appl. No. 15/153,709 dated Mar. 19, 2018; 8 pps.

* cited by examiner

FIG. 1

Prior Art

SLITTED SANDWICH INSULATED ARC SAW BLADE HAVING A TRANSLATIONAL RAIL ASSMBLY AND DIRECT COUPLING TO A ROTATIONAL PIVOT PIN

CROSS-REFERENCE TO RELATED APPLICATIONS

The present application claims benefit and priority to, and is a continuation of, U.S. patent application Ser. No. 15/153,709 filed on May 12, 2016 and issued as U.S. Pat. No. 10,014,084 on Jul. 3, 2018, which itself claims benefit and priority to and is a non-provisional of, U.S. Provisional Patent Application No. 62/160,250 filed on May 12, 2015, the entirety of each of which is hereby incorporated by reference herein.

BACKGROUND

Field of the Invention

The present invention is in the technical field of material "segmenting" and particularly in the field of hazardous material segmenting and/or segmenting in hazardous environments, such as nuclear power plant component and equipment dismantling, or any application where metallic components are to be segmented for removal and disposal. More particularly, the present invention is in the technical field of remotely segmenting radioactive and non-radioactive nuclear reactor vessels and internal components thereof, and all related nuclear components such as piping and tanks, vessels, and spent nuclear fuel storage canisters. The invention is applicable to segmenting in air or underwater, carbon steel and stainless steel or stainless steel-clad carbon steel, which are typically found in reactor vessels and internals. The technology is generally applicable to cutting any electrically-conducting material.

History of Segmenting Technologies

Prior segmenting activities primarily relied upon electric plasma arc cutting torches, Electric Discharge Machining (EDM), or mechanical circular or band saw cutting, and high-pressure Abrasive Water Jet (AWJ) cutting equipment. These electric and mechanical tools are slow, have limited capability for cutting thick materials, generate potentially explosive gases including hydrogen, and generate secondary waste streams from the "dross" (very fine particulate removed from the "kerf"—the actual cut) thereby obstructing underwater clarity and vision required to accomplish the segmentation. The fine particulate dross is highly radioactive and is suspended in underwater cutting pools and vessels, causing unacceptable exposure of radiation to workers above the cutting pools controlling the tool position.

The mechanical cutting tools of circular or band saws are the slowest of any cutting method, having a cutting speed of less than two (2) square inches per minute (thickness times length per minute). Mechanical cutting generates secondary waste in the form of generally large particle "swarf" (the material removed from the kerf in mechanical cutting), which has proven difficult to capture at the source. It has required, for example, a separate subsequent underwater vacuuming system to collect and dispose of the swarf. The circular and band saws have a short life expectancy as the teeth wear away or become dull, requiring frequent blade changes which can take anywhere from one (1) to three (3) hours per change. Tool reaction forces and tool chatter are also major concerns requiring massive, rigid support systems (manipulators) to accurately position and hold the blade in the kerf. Earlier attempts to use mechanical cutting by means of saws to segment large metal objects were laborious, slow and time-consuming, and consumed cutting tools, normally saw blades or milling cutters, at a rapid rate. Consequently, mechanical saw blade or milling cutter segmentation is quite expensive. Prior experience using abrasive saws or cut-off wheels have proven similarly slow and dangerous as the abrasive wheel is subject to breaking and flying off at the high speed required to accomplish the cut, potentially injuring workers.

Flame cutting using oxygen-acetylene, oxygen-propane, or oxygen-gasoline torches or burners are faster, but do not burn hot enough to penetrate stainless steel materials effectively. They generate large quantities of gases that must be controlled, especially when cutting radioactively contaminated or activated materials like nuclear reactor vessels. Similarly, high-temperature plasma arc cutting torches have been used wherein a high voltage arc coupled with an inert gas creates a high temperature plasma to melt the metal from the kerf. These plasma arc torches are faster (five (5) to twelve (12) square inches a minute) than mechanical or AWJ cutting, but generate large quantities of hydrogen and contaminated gases, and the particulate from the kerf clouds the cutting pool water obstructing visibility.

EDM uses a focused electric arc to melt metal similar to the arc saw, but the arc beam is not sufficiently powerful, nor fast enough to be used for the much larger metal thicknesses encountered in reactor dismantling. The cutting speed is much less than one (1) square inch per minute.

Another technology applied relatively recently in the nuclear industry for decommissioning reactor vessels and internals is high-pressure AWJ cutting. The process uses a high-pressure pump (called an intensifier) to generate water pressures of between forty thousand pounds per square inch (40,000 psi) and sixty thousand pounds per square inch (60,000 psi), directed through a jet nozzle into which is also injected by high-pressure air an abrasive grit such as garnet. The combination of water pressure and grit erodes the metal in the kerf (areas being cut). This method has been used for both nuclear reactor vessels and internals, on both carbon steels and stainless steels. However, the process is exceedingly slow at less than two (2) square inches of material per minute (comparable at best to mechanical saw cutting), and generates an exorbitant amount of secondary waste in the form of contaminated water and grit, mixed with the radioactive material removed from the kerf. As an example, a typical AWJ will consume approximately five (5) to eight (8) gallons per minute of water and one (1) to two (2) pounds of grit per gallon of water, resulting in five (5) to sixteen (16) pounds of grit per minute of cutting. To cut a two (2) inch thick plate for a distance of twelve (12) inches would take twelve (12) minutes, and generate sixty (60) to ninety-six (96) gallons of water and sixty (60) to one hundred and ninety-two (192) pounds of grit. For carbon steel and a one-eighth (⅛) inch wide kerf, these grit volumes represent seventy (70) to two hundred and twenty-three (223) times the amount of material removed from the kerf. The spent grit is co-mingled with the radioactive swarf of the kerf, and requires special packaging for transport and disposal to a licensed radioactive disposal facility. The grit cannot be recycled. AWJ grit emanating from the kerf disintegrates into a fine particulate which obscures underwater clarity and vision, requiring frequent cessation of segmenting operations to allow pool or vessel filtering systems to clean up the water. Control and collection of this radioactive grit as it exits the kerf has been a serious problem for the nuclear industry, requiring extensive post-cutting collection and cleanup of the cutting pool or reactor. Although the AWJ reaction forces are not as large as in mechanical cutting, the tool still requires a rigid support manipulator to position and maintain the jet in the kerf.

None of the foregoing cutting technologies can effectively cut through the multiple thicknesses frequently encountered in reactor vessel and internals segmentation. Plasma arc torches and EDM can only maintain their arc over a short distance and thickness, and cannot extend through multiple thicknesses of material. Circular and band saws encounter tool chatter causing rapid loss of sharpness and tool teeth from the blade. The exit spray from the kerf of the AWJ cutters fans out from the first material thickness encountered, and loses its ability to concentrate the jet to pierce through the second or more thicknesses of the cut.

History of Arc Saw Development

The arc saw was originally proposed and patented in various forms as a machining tool in U.S. Pat. No. 2,015,415 in 1935, U.S. Pat. No. 2,059,236 in 1936, and U.S. Pat. No. 2,355,838 in 1944 (de-surfacing/machining devices), U.S. Pat. No. 4,243,862 (an arc cutting device), and U.S. Pat. No. 4,608,477 in 1986 (a hand held electric arc saw apparatus). The latter hand-held arc saw would not be suitable for the highly radioactive components of nuclear reactor vessels, internals or similarly radioactive components owing to the excessive radiation exposure to the worker.

The most recent arc saw patents (known to Applicant) are U.S. Pat. Nos. 4,401,875 and 4,463,242 (hereinafter called the "Retech Patents"; as they are both assigned to Retech, Inc. of Ukiah, Calif.) describe in detail the actual operation of a standard arc saw, the voltage and current required, and the quality of the kerf.

The arc saw described in the Retech Patents comprises a toothless carbon steel circular blade supported on an arbor (shaft) and driven by an oil-hydraulic motor. The blade is connected to a low-voltage, high-amperage electric power supply through commutators mounted on the blade rotating head. The power supply provides twenty-five (25) to fifty (50) volts of Direct Current (DC) and an amperage of fifteen thousand (15,000) to twenty-five thousand (25,000) amperes to the blade to melt the material being cut (hereinafter, the "work piece"). The blade does not touch the work piece, and servo-motors are used to maintain an arc of eight (8) to sixteen (16) thousandths of an inch gap using an electrical feedback control circuit and opposing force servo-motors (to eliminate slack) based on maintaining a constant amperage to the work-piece. There are virtually no reaction forces between the blade and work-piece other than the small amount of friction of the blade through the water used for cooling the blade. The blade of the Retech Patents, in practice, encountered difficulties with side-arcing of the blade to the work-piece, causing rapid degradation of the blade and in some cases distortion of the blade due to heating from the side arc and magnetic distortion from the high current.

The authors of the Retech Patents built a prototype for testing, and developed the mathematical relationships empirically for cutting current versus thickness of material to be cut, and the speed of cutting. The final equation the authors developed is as follows:

$$v = [I/s - J_0]1/M$$

Where:
v=cutting speed in m/sec
I=the cutting current in amps
s=w times l in m2=the effective surface area of the kerf or cut=width times length $J_0$=threshold current density=a×106 amperes per square meter, wherein "a"=2 to 6
M=the change of the current density divided by the change in the velocity The two original authors of the Retech Patents ran more than six hundred (600) tests of the arc saw to develop these cutting parameters and this cutting speed relationship. Their findings are generally accepted in arc saw design.

The performance of the arc saw of the Retech Patents is indicated in the following example. Using a blade of approximately one-quarter (¼) of an inch thick, and an operating voltage of twenty-five (25) volts, a cutting current ("I") of thirteen thousand (13,000) amps, a cutting speed of approximately two hundred and seventy-nine inches squared per minute (279 in$^2$/min) was achieved in carbon steel, and seven hundred and seventy-five inches squared per minute (775 in$^2$/min) in aluminum. These cutting rates in steel are fifty (50) to one hundred and forty (140) times faster than mechanical cutting, plasma arc or AWJ cutting. Higher rates are achievable using higher cutting amperages.

The Retech Patents overcame some of the much earlier difficulties of an inability to sustain the cutting action of the arc saw, rapid wear of the blade, unexpected current surges and voltage variations resulting in unreliable cutting speeds. They also designed a blade configuration to include gullets around the blade periphery to permit removal of the cutting debris (dross) from the kerf. These gullets also served to cool the blade when immersed in water. However, side arcing of the blade to the work piece was still a problem with rapid blade wear and consumption. This arc saw required the blade to be completely immersed in water for cooling and removal of the dross. In-air cutting without cooling would rapidly degrade and distort the blade resulting in a short blade life and frequent blade changes. The blade material for the Retech Patents blade was carbon steel, which while less expensive is subject to magnetic distortion (bending) from the high currents between the work-piece and the blade, particularly when cutting carbon steel. This distortion also contributed to short blade life. This design was not capable of rapid blade changes which is advantageous in reactor vessel and internals segmentation.

The Retech Patents arc saw invention found limited acceptance in the nuclear decommissioning industry, although the Japanese applied the principle to segmenting the reactor vessel at the Japan Power Demonstration Reactor, and in the U.S., Argonne National Laboratory West used it to segment parts of nuclear fuel assemblies to prepare them for shipping and disposal. Other companies offering mechanical or electrical segmentation services apparently were unfamiliar with the arc saw, and had already committed their financial and technical personnel resources to the other aforementioned technologies as they knew these technologies best. Companies were also generally afraid to take a chance on a new technology, and hadn't spent the time to research where the arc saw could be used successfully. They may also have been concerned about the reports of the "rough cut" surface produced by the existing arc saw.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Embodiments of the present invention generally comprise an electric arc saw system and methods for operating the saw for cutting or slitting metallic objects by melting a narrow kerf into the work piece. The arc saw in some embodiments is ideally suited to cut electrically conducting metallic components of a nuclear power reactor vessel and internals, spent fuel dry cask canisters, or any radioactive or non-radioactive component, such as in the process of dismantling these components at the end of their useful lives.

Nuclear power reactor vessels and their internals generally vary in diameter and length depending on the designed thermal power capacity. Typical sizes are from about four feet (4 ft.) in diameter up to about twenty-two feet (22 ft.) in diameter, and from about twelve feet (12 ft.) in height up to about sixty-five feet (65 ft.) in height. Metal thicknesses for reactor vessels and/or internals range from about three (3) inches up to about seventeen (17) inches. Reactor vessels are typically constructed of carbon steel, clad on the inside with stainless steel. The reactor vessel internals are often primarily constructed of stainless steel. At the end of their useful life, these vessels and internals must be segmented for packaging and controlled (i.e., safe) disposal. In some cases, spent fuel canisters are utilized as containers to store spent nuclear fuel in dry storage. Spent Fuel Storage Installations (SFPI) are often on-site at nuclear power facilities. In some cases, these containers may need to be cut open prior to fuel transfer to a federal repository, so that the fuel may be repackaged in approved shipping and disposal casks for ultimate disposal in the repository.

Embodiments of the present invention are adapted to eliminate various difficulties encountered in the application of previous attempts to utilize arc saw technology in the field of nuclear reactor vessel decommissioning. In some embodiments, for example, systems of the present invention segment utilizing a circular stainless steel toothless saw blade with a low voltage differential between the blade and the work piece, but at very high amperage. The high amperage melts the metal from the kerf and the blade may remove the dross by a series of radial slits along the blade. The arc saw blade and drive head in some embodiments will be supported by a hydraulic, pneumatic, and/or electrically controlled manipulator. Dross removal may be accomplished using an electromagnetic particulate separation system and/or conventional wound filters. According to some embodiments, an improved arc saw blade may comprise a plurality of integral radial slits (e.g., at spaced radial intervals about the blade and/or from the blade center), side insulators to improve blade life, improvements in the blade advancement controls in the radial, vertical, and/or circumferential directions e.g., with a digital feedback computer system, blade side water sprays to permit in-air cutting, oil-hydraulic, water-hydraulic or air-powered motors to rotate the blade, a quick-change blade arbor, and/or a blade shroud to direct dross to a collection system.

II. Prior Art Segmenting System

Figure 1:
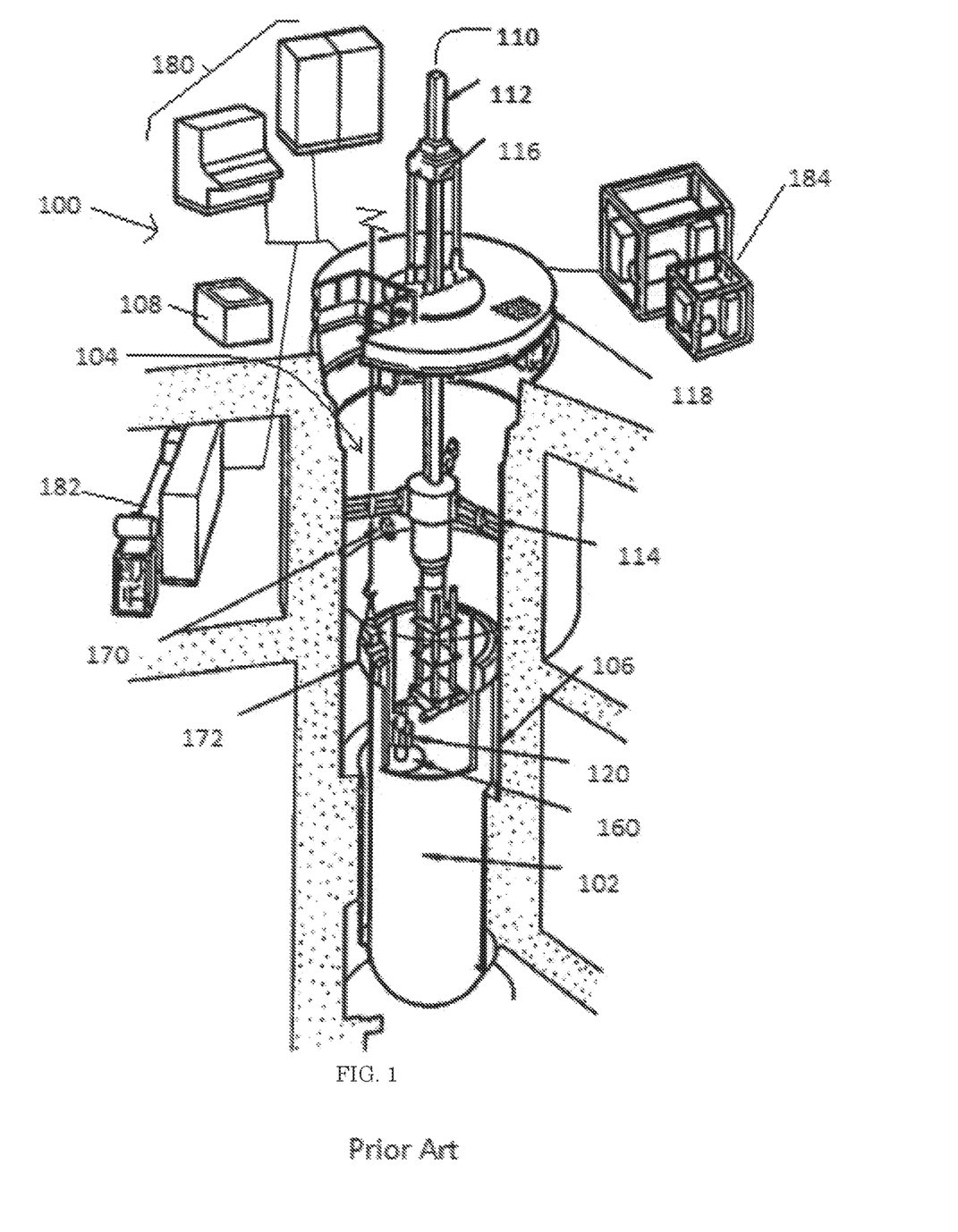
FIG. 1 is a perspective view of a prior art nuclear reactor vessel segmenting system.

Turning initially to FIG. 1, a perspective view of a prior art nuclear reactor vessel segmenting system 100 is shown. The prior art nuclear reactor vessel segmenting system 100 may, for example, comprise a nuclear reactor vessel (e.g., a pressure vessel) 102 defining an interior volume such as a reactor cavity 104. The nuclear reactor vessel 102 is typically disposed in a concrete shield 106 (e.g., to minimize radioactive exposure in areas external to the reactor vessel 102). For decommissioning, dismantling, and/or other segmenting of the reactor vessel 102 (and/or internal or related components, not shown for ease of illustration), portions of the reactor vessel 102 are generally cut from the reactor vessel 102 and placed in a container 108 (e.g., for radioactive waste storage and/or transportation). In the prior art system 100, a cutting system 110 utilized for segmenting comprised a central mast 112 stabilized by a plurality (e.g., three (3)) mast snubbers 114. The cutting system 110 included a vertical or mast lifting mechanism 116 and a mast rotating mechanism 118. The mast lifting mechanism 116 and a mast rotating mechanism 118 were utilized, for example, to raise, lower, and position a blade mechanism 120.

The blade mechanism 120 included an arc saw blade 160 (similar to that described in the Retech Patents), a camera 170 for remote positioning/viewing, and a holding/transfer unit 172 for removing segmented portions of the reactor vessel 102 from the reactor cavity 104. The camera 170 was utilized in conjunction with a remote control console 180 and power to the various components was provided by an electric power supply 182 and a hydraulic power unit 184. In such a manner, some of the advantages of utilizing the arc saw blade 160 for nuclear reactor decommissioning were realized. Due to limited industry acceptance, however, other more traditional segmenting methodologies have been employed in favor of arc saw technology as exemplified by the prior art nuclear reactor vessel segmenting system 100 of FIG. 1.

III. Improved Segmenting System

Referring now to FIG. 2A, FIG. 2B, FIG. 2C, FIG. 2D, and FIG. 2E, a perspective view, a (first) partial close-up perspective view, a (second) partial close-up perspective view, a (third) partial close-up perspective view, and a (fourth) partial close-up perspective view, of nuclear reactor vessel segmenting system 210 according to some embodiments, respectively, are shown.

Figure 2A:
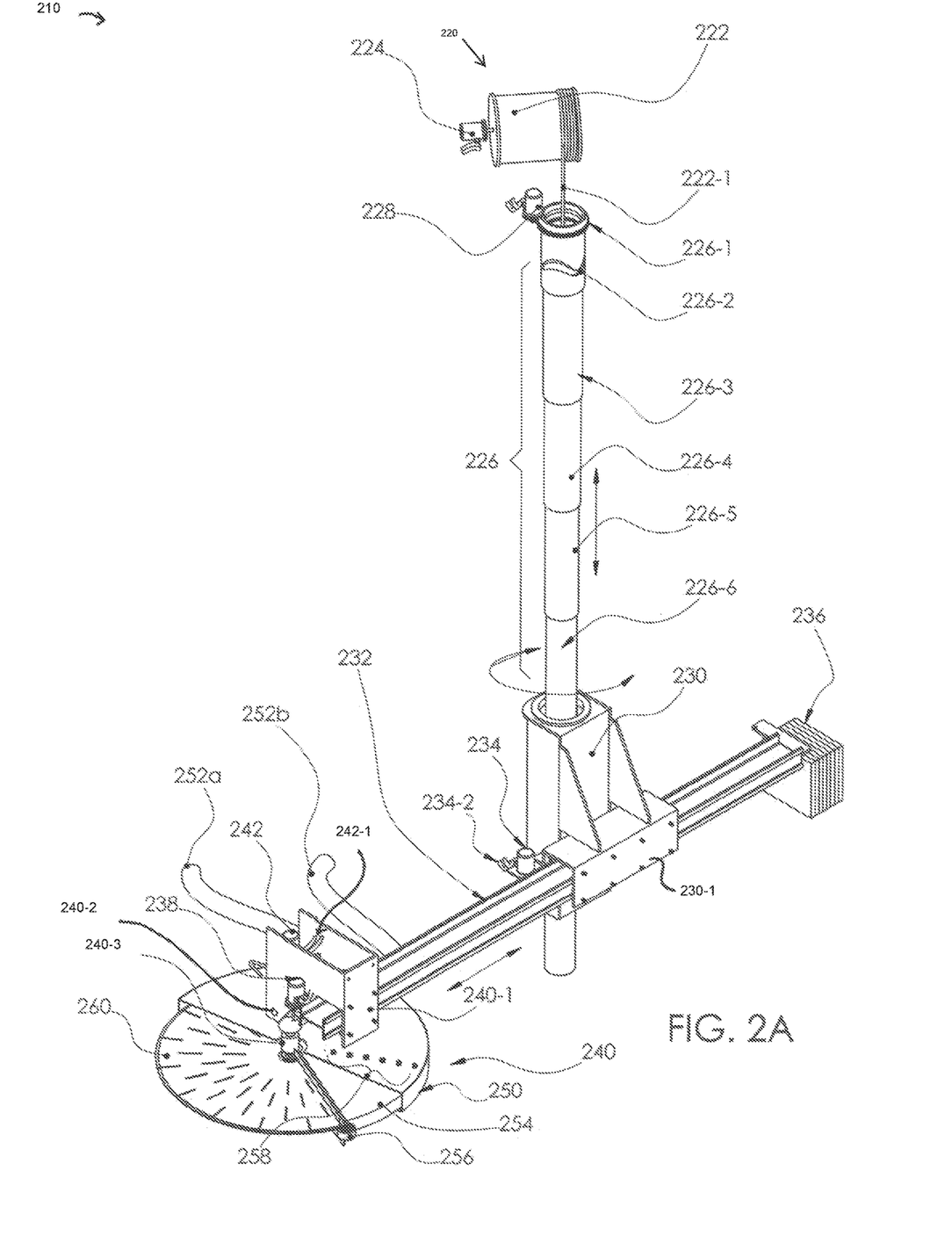
FIG. 2A is a perspective view of nuclear reactor vessel segmenting system according to some embodiments.
Figure 2B:
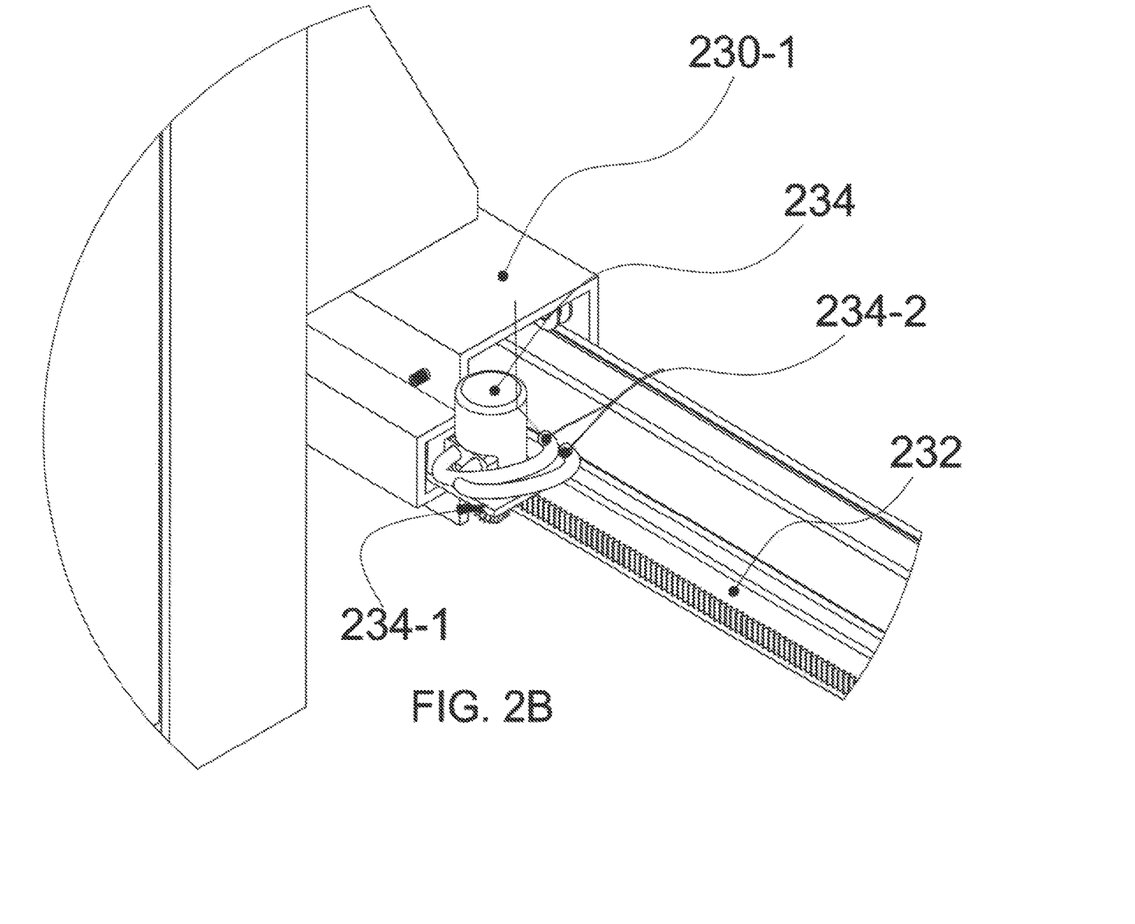
FIG. 2B is a partial close-up perspective view of the nuclear reactor vessel segmenting system of FIG. 2A according to some embodiments.
Figure 2C:
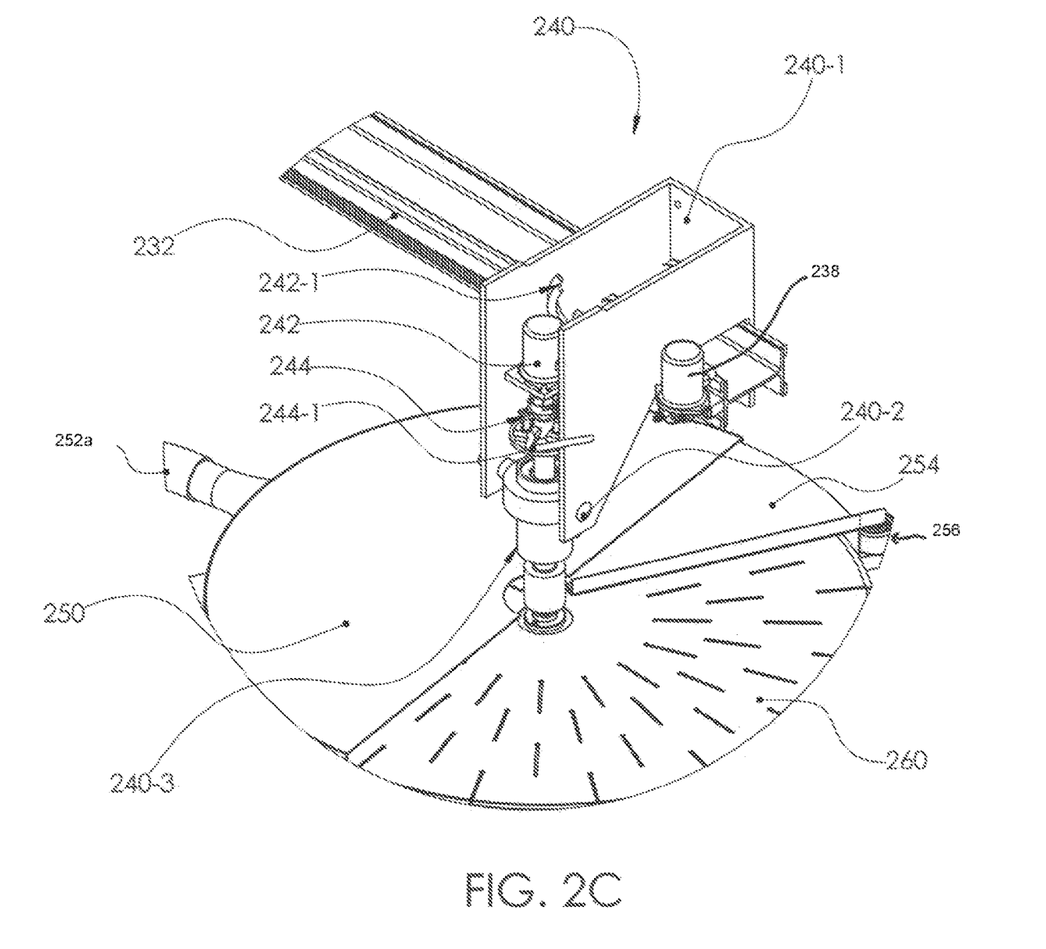
FIG. 2C is a partial close-up perspective view of the nuclear reactor vessel segmenting system of FIG. 2A according to some embodiments.

In some embodiments, the nuclear reactor vessel segmenting system 210 may comprise a blade mechanism 220 comprising a vertical drive assembly 222 operable to extend and retract a cable 222-1 by operation and/or engagement with a vertical drive motor 224. The cable 222-1 may be attached to and/or operable to raise and lower, for example, a telescoping vertical shaft 226. The telescoping vertical shaft 226 (or "mast") may, for example, be operable to vertically position the blade mechanism 220 for segmenting operations. In some embodiments, the telescoping vertical shaft 226 may comprise a rotational ring gear 226-1 coupled to a primary or outer telescoping shaft member 226-2. The primary/outer telescoping shaft member 226-2 may house and/or couple to a plurality of inner telescoping shaft members such as a secondary telescoping shaft member 226-3, a tertiary telescoping shaft member 226-4, and/or a quaternary telescoping shaft member 226-5. According to some embodiments, the telescoping vertical shaft 226 may comprise or be coupled to a saw support rod 226-6. The various telescoping shaft members 226-3, 226-4, 226-5, 226-6 may, for example, nest within each respective member of larger diameter (e.g., with the primary/outer telescoping member 226-2 comprising the largest inside diameter according to some embodiments, such as shown in FIG. 2A). While the telescoping vertical shaft 226 is depicted with the plurality of components 226-3, 226-4, 226-5, 226-6 depicted in FIG. 2A, in some embodiments fewer or more components 226-3, 226-4, 226-5, 226-6 may be included in the telescoping vertical shaft 226, as becomes desirable or practicable (e.g., depending upon a desired vertical reach of the blade mechanism 220). In some embodiments, the telescoping vertical shaft 226 (or a portion or component thereof) may be rotated about a vertical axis (not depicted) by operation of and/or engagement with a rotational drive motor 228 (e.g., coupled to engage with the rotational ring gear 226-1).

According to some embodiments, the nuclear reactor vessel segmenting system 210 may comprise a rotational blade mounting assembly 230 coupled to the telescoping vertical shaft 226 and/or the saw support rod 226-6 thereof. The rotational blade mounting assembly 230 may, for example, be fixedly coupled to the saw support rod 226-6 such that rotation of the saw support rod 226-6 (and/or the telescoping vertical shaft 226) imparts like rotation or rotational force to the rotational blade mounting assembly 230. In some embodiments, the rotational blade mounting assembly 230 may comprise a housing or bracket 230-1 that accepts and/or couples to a horizontal translation rail 232. The horizontal translation rail 232 may, in some embodiments, comprise a track or beam that slides through and/or within the bracket 230-1 (e.g., on rollers or guides therein, not shown). The horizontal translation rail 232 may, for example, be operable to laterally or radially position the blade mechanism 220 for segmenting operations, such as to control a rate of feed of the blade mechanism 220 into a work piece (not shown in FIG. 2A). According to some embodiments, the horizontal translation rail 232 may be translated and/or moved (e.g., laterally) with respect to the rotational blade mounting assembly 230 by operation of and/or engagement with a translational drive motor 234. The translational drive motor 234 may, for example, utilize a translational gear 234-1 to engage with and impart translational force and/or movement to the horizontal translation rail 232. According to some embodiments, the translational drive motor 234 may receive power from translational power leads 234-2.

In some embodiments, the horizontal translation rail 232 may comprise and/or be coupled to, at a first end thereof, a counterweight 236 and/or may comprise and/or be coupled to, at a second and opposing end thereof, a blade orientation actuator 238. The counterweight 236 may counter balance, for example, the weight of a blade assembly 240 coupled to the second end of the horizontal translation rail 232 and selectively oriented by actuation of the blade orientation actuator 238. In some embodiments, the blade assembly 240 may comprise a saw mount bracket 240-1 coupled to (or proximate to) the second end of the horizontal translation rail 232 such that translational repositioning of the horizontal translation rail 232 with respect to the bracket 230-1 of the rotational blade mounting assembly 230 also causes a repositioning (e.g., a translational movement) of the blade assembly 240.

Figure 2D:
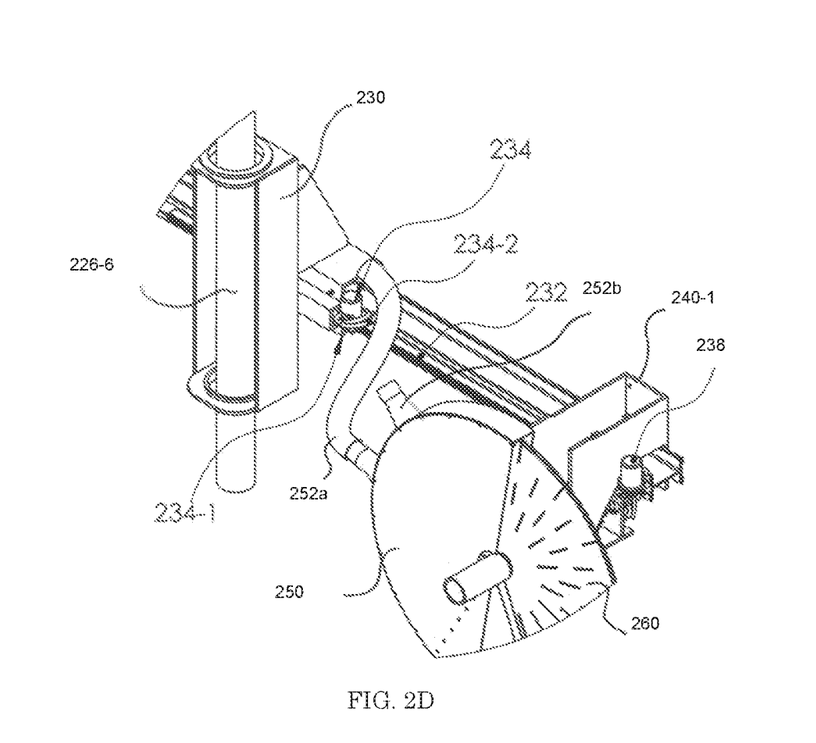
FIG. 2D is a partial close-up perspective view of the nuclear reactor vessel segmenting system of FIG. 2A according to some embodiments.
Figure 2E:
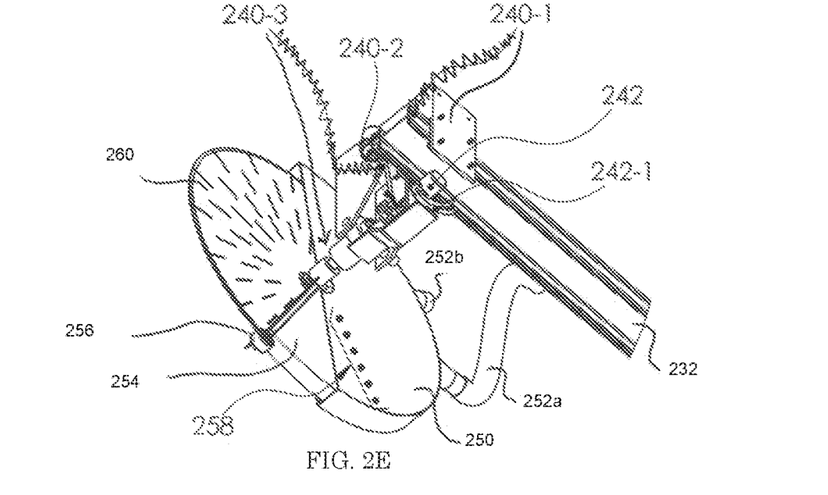
FIG. 2E is a partial close-up perspective view of the nuclear reactor vessel segmenting system of FIG. 2A according to some embodiments.

According to some embodiments, the blade assembly 240 may comprise a pivot pin 240-2 about which the blade orientation actuator 238 may cause a drive shaft 240-3 to pivot. The blade orientation actuator 238 may cause the drive shaft 240-3 (and/or components coupled thereto) to reorient and/or reconfigure from a first orientation (e.g., horizontal) as depicted in FIG. 2A to a second orientation (e.g., vertical) as depicted in FIG. 2D. In some embodiments, the drive shaft 240-3 may be rotationally engaged and/or driven by a blade drive motor 242 that is supplied with power (e.g., for a hydraulic, air-operated, and/or electric motor) via blade motor power leads 242-1 (e.g., wires, cables, hoses, etc., as applicable to the type of the blade drive motor 242). In the case that the blade drive motor 242 comprises an air-operated motor, the nuclear reactor vessel segmenting system 210 may comprise an exhaust (not shown) to capture and vent gases (e.g., to the atmosphere) from the blade drive motor 242. According to some embodiments, the blade drive assembly 240 may comprise a power commutator 244 that is supplied with power via commutator power leads and imparts electrical current through, along, and/or with the drive shaft 240-3.

In some embodiments, the blade drive assembly 240 may comprise and/or be coupled to a blade shroud 250 (having a first dross outlet 252a and/or a second dross outlet 252b), a dross collection shroud 254, a dross collection shroud idler wheel 256, and/or a plurality of water jet ports 258. The blade shroud 250 may, for example, partially house, shield, and/or cover at least one portion of a saw blade 260 mounted to the drive shaft 240-3. As depicted in FIG. 2A, the blade shroud 250 may, in some embodiments, cover or house approximately fifty percent (50%) of the area of the saw blade 260 (e.g., may extend approximately one hundred and eighty degrees (180°) around the circumference of the saw blade 260). According to some embodiments, the dross outlet(s) 252a-b may collect and/or direct dross from within the blade shroud 250 (e.g., and direct collected dross (not shown) such as via applied suction or vacuum force to one or more filtering, separation, and/or collection components (e.g., the magnetic separator system 400 of FIG. 4 herein). In some embodiments, the dross collection shroud 254 may extend from (or from within) the blade shroud 250, such as to afford more shrouded area of the saw blade 260 for increased dross collection. According to some embodiments, the dross collection shroud 254 may be housed within the blade shroud 250 and actively drawn, engaged, and/or urged out of the blade shroud 250, e.g., by spring or other biasing mechanisms. In such embodiments, and/or in the case that the dross collection shroud idler wheel 256 is utilized, the dross collection shroud idler wheel 256 may ride along and/or engage with a part (e.g., work piece) to be segmented and apply the biasing force to the engaged part. In such a manner, for example, the dross collection shroud idler wheel 256 may permit the dross collection shroud 254 to remain close to an active cut (not shown) to increase dross collection. In some embodiments, the water jet ports 258 may accept pressurized water (or other fluid) flow, e.g., from one or more hoses or tubes (not shown), such as to provide liquid cooling to the saw blade 260, e.g., in the case that the saw blade 260 is utilized to segment or cut in non-aqueous environments (e.g., above water or in-air cutting). In some embodiments, the water jet ports 258 may be positioned to direct pressurized water (or other acceptable fluid) to either or both of the leading and trailing edges of the saw blade 260.

According to some embodiments, the saw blade 260 may be engaged by the blade drive motor 242 to spin at a rate of approximately one hundred and twenty feet per second (120 ft/sec). In some embodiments, the saw blade 260 may receive electrical current/voltage (e.g., high amperage, e.g., fifteen thousand (15,000) to twenty-five thousand (25,000) amperes, and/or low voltage, e.g., twenty-five (25) to fifty (50) volts) from the power commutator 244 and/or via the drive shaft 240-3, such as to provide for actuation of the saw blade 260 as an arc saw with respect to a work piece. In some embodiments, the saw blade 260 may be attached to the blade drive assembly 240 and/or the drive shaft 240-3 via a quick-change coupling (not explicitly shown) such as a slide locking nut, to allow for quick and easy changes of saw blades 260 (e.g., underwater in approximately thirty (30) minutes).

In some embodiments, any or all of the components 222, 222-1, 224, 226, 226-1, 226-2, 226-3, 226-4, 226-5, 226-6, 228, 230, 230-1, 232, 234, 234-1, 234-2, 236, 238, 240, 240-1, 240-2, 240-3, 242, 242-2, 244, 244-1, 250, 252a-b, 254, 256, 258, 260 of the nuclear reactor vessel segmenting system 210 an/or the blade mechanism 220 may be similar in configuration and/or functionality to any similarly named and/or numbered components described herein. Fewer or more components 222, 222-1, 224, 226, 226-1, 226-2, 226-3, 226-4, 226-5, 226-6, 228, 230, 230-1, 232, 234, 234-1, 234-2, 236, 238, 240, 240-1, 240-2, 240-3, 242, 242-2, 244, 244-1, 250, 252a-b, 254, 256, 258, 260 (and/or portions thereof) and/or various configurations of the components 222, 222-1, 224, 226, 226-1, 226-2, 226-3, 226-4, 226-5, 226-6, 228, 230, 230-1, 232, 234, 234-1, 234-2, 236, 238, 240, 240-1, 240-2, 240-3, 242, 242-2, 244, 244-1, 250, 252a-b, 254, 256, 258, 260 may be included in the nuclear reactor vessel segmenting system 210 an/or the blade mechanism 220 without deviating from the scope of embodiments described herein. In some embodiments, one or more of the various components 222, 222-1, 224, 226, 226-1, 226-2, 226-3, 226-4, 226-5, 226-6, 228, 230, 230-1, 232, 234, 234-1, 234-2, 236, 238, 240, 240-1, 240-2, 240-3, 242, 242-2, 244, 244-1, 250, 252a-b, 254, 256, 258, 260 may not be needed and/or desired in the nuclear reactor vessel segmenting system 210 an/or the blade mechanism 220.

While the terms "horizontal" and "vertical" are used for exemplary purposes to describe the configuration and/or operation of the nuclear reactor vessel segmenting system 210 an/or the blade mechanism 220 in accordance with some embodiments, such terminology is not limiting. Other frames of reference and/or orientations may be utilized without deviating from the scope of some embodiments.

IV. Improved Arc Saw Blade

Figure 3A:
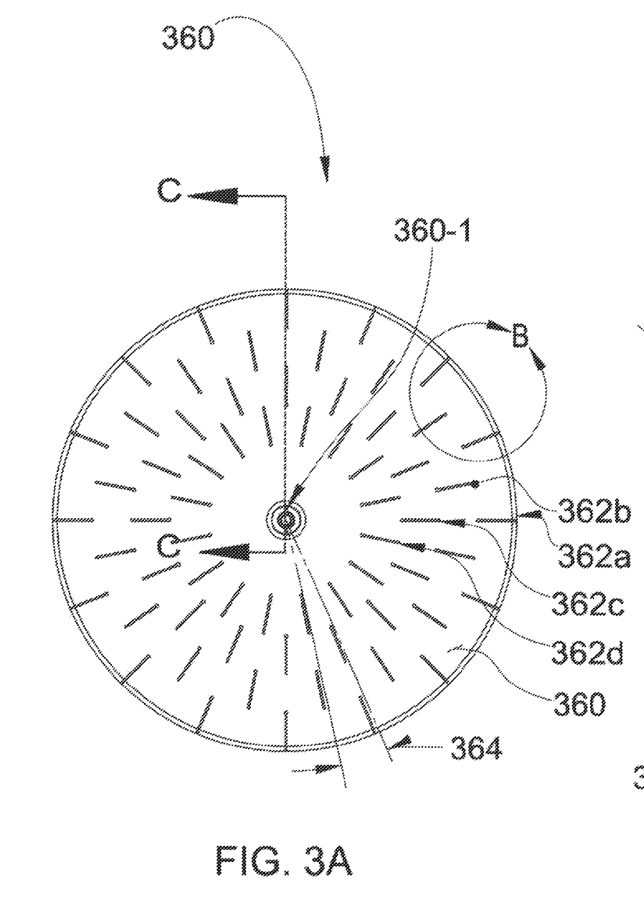
FIG. 3A is a top view of a modified arc saw blade according to some embodiments.
Figure 3B:
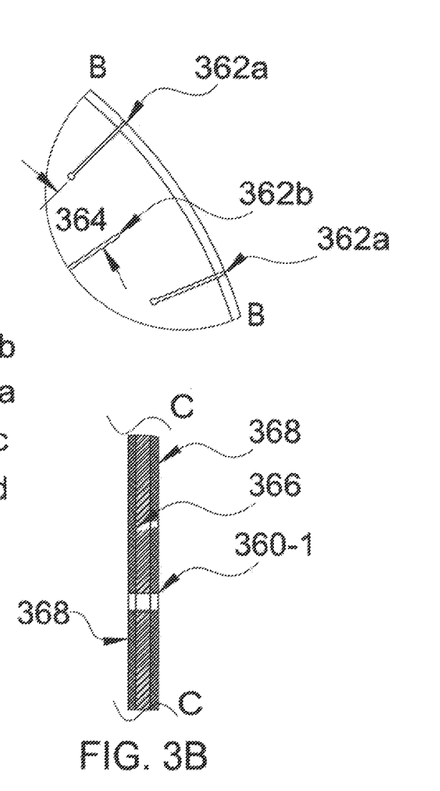
FIG. 3B is a partial cross-sectional view of the modified arc saw blade of FIG. 3A according to some embodiments.

Turning now to FIG. 3A and FIG. 3B, a top view and a partial cross-sectional view, respectively, of a modified arc saw blade 360 according to some embodiments are shown. According to some embodiments, the arc saw blade 360 may comprise a stainless steel blade (e.g., for segmenting carbon steel reactor components; not shown in FIG. 3A or FIG. 3B). Stainless steel is austenitic (non-magnetic), which may reduce previously experienced problems with blade distortion due to magnetic forces when cutting through thick sections of carbon steel. In some embodiments, the arc saw blade 360 may comprise a circular, toothless blade having a diameter between ten (10) and forty-eight (48) inches and a thickness of between sixty thousandths (0.060) and two hundred and fifty thousandths (0.250) of an inch (e.g., dependent upon the blade diameter employed for a particular segmenting operation or task).

In some embodiments, the modified arc saw blade 360 comprises and/or defines a blade mounting hole 360-1. In the case where the modified arc saw blade 360 is circular in configuration the blade mounting hole 360-1 may be positioned at the center of the circle. According to some embodiments, the modified arc saw blade 360 may comprise a plurality of slits 362a-d, e.g., primarily for cooling and/or dross removal during operation and/or engagement of the modified arc saw blade 360 with a work piece. The plurality of slits 362a-d may also allow for peripheral expansion of the arc saw blade 360 from heating during segmenting operations, which facilitates a minimization of blade distortion. As depicted, in some embodiments the slits 362a-d may be arranged in various groupings about the modified arc saw blade 360. In some embodiments for example, a plurality of primary slits 362a may be arranged about the circumference of the modified arc saw blade 360 (e.g., at a first radial distance from the center) and extend inward radially by a first length (e.g., to a second radial distance from the center). As depicted in FIG. 3A, the first radial distance may be equivalent to the radius of the modified arc saw blade 360 (e.g., each primary slit 362a may initiate/terminate at the edge of the modified arc saw blade 360) and the second radial distance may be less than the first radial distance by an amount equivalent to the length of the primary slit 362a.

According to some embodiments, the modified arc saw blade 360 may also or alternatively comprise a plurality of secondary slits 362b. The plurality of secondary slits 362b may be arranged about the area of the modified arc saw blade 360 (e.g., at the second radial distance from the center, as depicted) and extend inward radially by a second length (e.g., to a third radial distance from the center). As depicted in FIG. 3A, the plurality of secondary slits 362b may initiate/terminate at the second radial distance which is coincident with the initiation/termination of the plurality of primary slits 362a, and the third radial distance may be less than the second radial distance by an amount equivalent to the length of the secondary slits 362b. According to some embodiments, the secondary slits 362b may be offset angularly from the primary slits 362a by a slit separation angle 364.

In some embodiments, the modified arc saw blade 360 may also or alternatively comprise a plurality of tertiary slits 362c. The plurality of tertiary slits 362c may be arranged about the area of the modified arc saw blade 360 (e.g., at the third radial distance from the center, as depicted) and extend inward radially by a third length (e.g., to a fourth radial distance from the center). As depicted in FIG. 3A, the plurality of tertiary slits 362c may initiate/terminate at the third radial distance which is coincident with the initiation/termination of the plurality of secondary slits 362b, and the fourth radial distance may be less than the third radial distance by an amount equivalent to the length of the tertiary slits 362c. According to some embodiments, the tertiary slits 362c may be offset angularly from the secondary slits 362b by the slit separation angle 364.

According to some embodiments, the modified arc saw blade 360 may also or alternatively comprise a plurality of quaternary slits 362d. The plurality of quaternary slits 362d may be arranged about the area of the modified arc saw blade 360 (e.g., at the fourth radial distance from the center, as depicted) and extend inward radially by a fourth length (e.g., to a fifth radial distance from the center). As depicted in FIG. 3A, the plurality of quaternary slits 362d may initiate/terminate at the fourth radial distance which is coincident with the initiation/termination of the plurality of tertiary slits 362c, and the fifth radial distance may be less than the fourth radial distance by an amount equivalent to the length of the quaternary slits 362d. According to some embodiments, the quaternary slits 362d may be offset angularly from the tertiary slits 362c by the slit separation angle 364.

In some embodiments, the arrangement of the plurality of slits 362a-d may allow for cooling and minimal distortion of the arc saw blade 360 while maintaining structural integrity and/or rigidity of the arc saw blade 360. In one non-limiting example, an arc saw blade 360 having a diameter of thirty (30) inches may comprises sixteen (16) slits 362a-d in any given grouping of slits 362a-d (e.g., sixteen (16) primary slits 362a). In some embodiments, the primary slits 362a (and/or any or all of the other slits 362b-d) may have a width of between two tenths (0.2) and three tenths (0.3) of an inch and/or the first length may be approximately one quarter (¼) of the radius (or usable/cutting radius) of the arc saw blade 360.

According to some embodiments, any or all of the plurality of primary slits 362a, the plurality of secondary slits 362b, the plurality of tertiary slits 362c, and the plurality of quaternary slits 362d may comprise fewer or more slits 362a-d than depicted in FIG. 3A. According to some embodiments, the slit separation angle 364 may vary between any or all of the plurality of primary slits 362a, the plurality of secondary slits 362b, the plurality of tertiary slits 362c, and the plurality of quaternary slits 362d. In some embodiments, the slit separation angle 364 may be equivalent among the groupings of slits 362a-d. In some embodiments, the first, second, third, and/or fourth lengths may vary between the groupings of slits 362a-d, while in other embodiments such as depicted in FIG. 3A, the first, second, third, and/or fourth lengths may be equivalent.

According to some embodiments, as depicted in FIG. 3B, the modified arc saw blade 360 may comprise a core material 366 (e.g., stainless steel for cutting carbon steel work pieces or carbon steel for cutting stainless steel work pieces) sandwiched between two insulation layers 368, which may, for example, reduce side-arcing and slow degradation of the arc saw blade 360. According to some embodiments, the insulation layer(s) 368 may comprise an epoxy powder coating of between two thousandths (0.002) and five thousandths (0.005) of an inch thick. In some embodiments, the insulation layers 368 may be included on both sides of the modified arc saw blade 360, as depicted. In some embodiments, either or both of the insulation layers 368 may cover only a portion of the area of the modified arc saw blade 360. An insulation layer 368 may, for example, be disposed on an outer portion of the area of the modified arc saw blade 360 adjacent to the outer diameter thereof, with the remainder of the blade area not comprising an insulation layer 368. In some embodiments, the extent of coverage of the area of the modified arc saw blade 360 with an insulation layer 368 may be selected based on a design amperage or other work piece-specific parameters (e.g., different modified arc saw blades 360 with different configurations of the insulation layer(s) 368 may be employed for different segmenting jobs.

According to some embodiments, any or all of the components 360-1, 362-b, 364, 366, 368 of the modified arc saw blade 360 may be similar in configuration and/or functionality to any similarly named and/or numbered components described herein. Fewer or more components 360-1, 362-b, 364, 366, 368 (and/or portions thereof) and/or various configurations of the components 360-1, 362-b, 364, 366, 368 may be included in the modified arc saw blade 360 without deviating from the scope of embodiments described herein. In some embodiments, one or more of the various components 360-1, 362-b, 364, 366, 368 may not be needed and/or desired in the modified arc saw blade 360.

V. Magnetic Separation

Figure 4A:
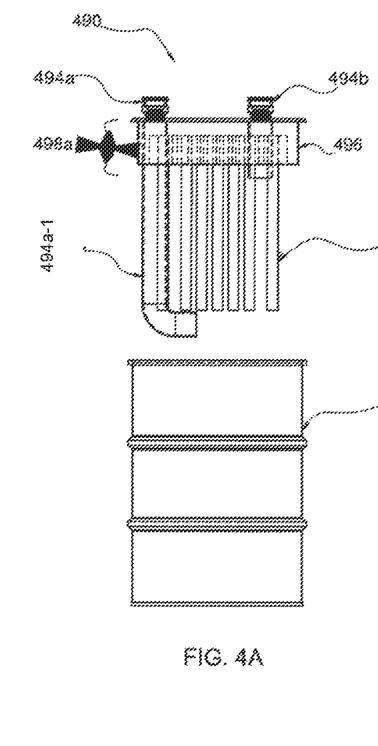
FIG. 4A is a side assembly view of a magnetic waste separation system according to some embodiments.
Figure 4B:
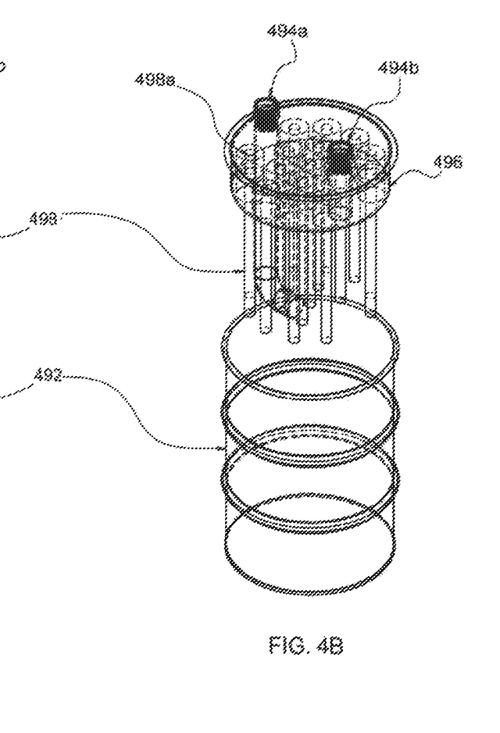
FIG. 4B is a perspective assembly view of the magnetic waste separation system of FIG. 4A according to some embodiments.

Referring now to FIG. 4A and FIG. 4B, a side assembly view and a perspective assembly view, respectively, of a magnetic waste separation system 490 according to some embodiments are shown. In some embodiments, the magnetic waste separation system 490 may comprise a magnetic separator reservoir 492 such as a steel drum as depicted. According to some embodiments, effluent (e.g., including dross) from work piece segmenting such as effluent provided by the dross outlet(s) 252a-b of FIG. 2A herein may be directed into the magnetic separator reservoir 492 via a magnetic separator inlet 494a. A liquid-vacuum or other pump (not shown) may, for example, direct the waste/dross from a blade shroud (not shown in FIG. 4A or FIG. 4B) and/or the site of segmenting operations (e.g., a reactor pool) and into the magnetic separator inlet 494a. In some embodiments, as depicted, the magnetic separator inlet 494a may comprise or be coupled to an inlet extension that, e.g., directs waste inflow from entry at the top of the magnetic separator reservoir 492, into the bottom of the magnetic separator reservoir 492. According to some embodiments, a magnetic separator outlet 494b may direct waste flow from the magnetic separator reservoir 492 to one or more external components (not shown) such as a filter system or device (e.g., a wound filter device). In some embodiments, the magnetic separator inlet 494a and/or the magnetic separator outlet 494b may be disposed on and/or coupled to a reservoir cap 496. According to some embodiments, the reservoir cap 496 may seat within and/or couple to the magnetic separator reservoir 492 to seal an open end of the magnetic separator reservoir 492 (e.g., to prevent spillage). In some embodiments, the reservoir cap 496 may also or alternatively house and/or couple to a plurality of magnetic components 498a-b. The reservoir cap 496 may, for example, house a plurality of magnetic coils 498a (e.g., waterproofed coils) coupled to magnetize a plurality of respective magnetic rods 498b. As depicted in FIG. 4A and FIG. 4B, in some embodiments the magnetic rods 498b may extend into the cavity of the magnetic separator reservoir 492, e.g., into the waste flow provided by the magnetic separator inlet 494a and/or the inlet extension 494a-1 thereof. In such a manner, for example, ferrous elements of the provided waste stream may be attracted to the magnetic rods 498b while non-ferrous waste (or otherwise non-magnetic waste) is directed externally via the magnetic separator outlet 494b. Ferrous components (ferrous dross, such as magnetized stainless steel particles) of nuclear reactor vessel segmenting via arc saw technology (e.g., as described herein) may accordingly be separated from non-ferrous components. According to some embodiments, larger particulates (about eight hundredths (0.08) to twenty-five hundredths (0.25) inches in diameter) in the dross introduced into the magnetic waste separation system 490 may fall or settle to the bottom of the magnetic separator reservoir 492. In some embodiments, medium magnetic particulates (about one hundredths (0.01) to three hundredths (0.03) inches in diameter) may be attracted to and collected on the magnetic rods 498b. Finer particulates may be directed, via the magnetic separator outlet 494b to a wound (or other) filter system (not shown).

In some embodiments, the magnetic waste separation system 490 may be utilized to process/separate stainless steel waste (e.g., Type 304, 316, 321, and/or 347) resultant as a by-product (dross) of stainless steel nuclear reactor vessel segmenting as described herein. Such stainless steel is typically non-magnetic. Applicant however, believes that the metallographic crystal structure of austenitic stainless steel changes from face-centered cubic to body-centered cubic and accordingly becomes ferro-magnetic (e.g., similar to carbon steel) upon exposure to arc saw segmenting operation as described herein. This phenomenon has heretofore been unrecognized and permits the magnetic waste separation system 490 to effectively remove magnetic stainless steel dross components from a segmenting operation waste stream, reducing operational costs (e.g., at least by lengthening the lifespan of wound filters through which the dross may be filtered).

According to some embodiments, any or all of the components 492, 494a-b, 494a-1, 496, 498a-b of the magnetic waste separation system 490 may be similar in configuration and/or functionality to any similarly named and/or numbered components described herein. Fewer or more components 492, 494a-b, 494a-1, 496, 498a-b (and/or portions thereof) and/or various configurations of the components 492, 494a-b, 494a-1, 496, 498a-b may be included in the magnetic waste separation system 490 without deviating from the scope of embodiments described herein. In some embodiments, one or more of the various components 492, 494a-b, 494a-1, 496, 498a-b may not be needed and/or desired in the magnetic waste separation system 490.

VI. System Overview

Figure 5:
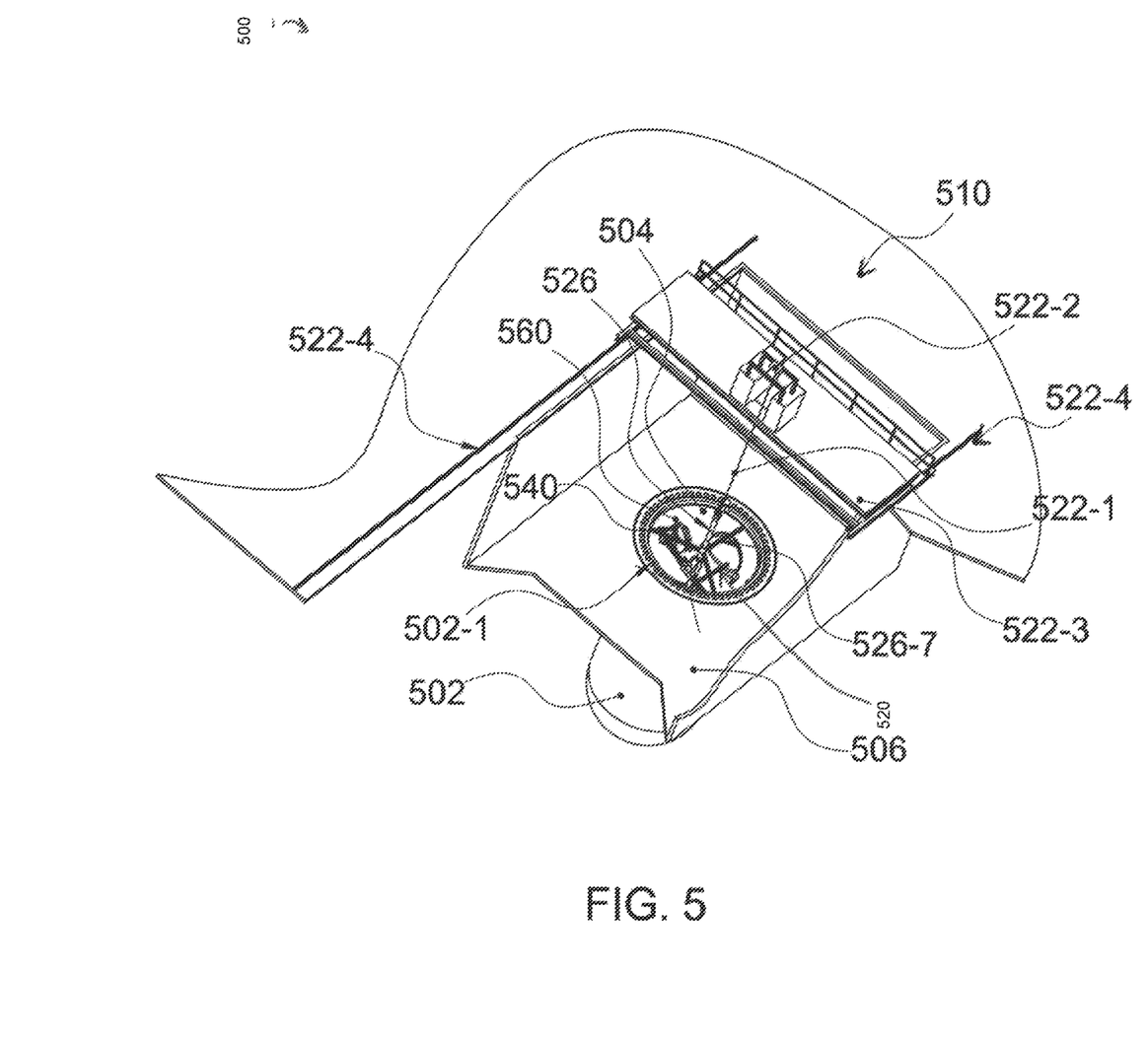
FIG. 5 is an upper perspective view of a nuclear reactor vessel segmenting system according to some embodiments.

Turning now to FIG. 5 an upper perspective view of a nuclear reactor vessel segmenting system 500 according to some embodiments is shown. In some embodiments, the nuclear reactor vessel segmenting system 500 may comprise a reactor vessel 502 having a flanged rim 502-1 around an entrance to an internal cavity 504 thereof. The reactor vessel 502 may, in some embodiments, be supported by and/or disposed within or coupled to a concrete shield 506. According to some embodiments, an improved arc saw cutting system 510 (e.g., as described in accordance with embodiments herein) may be disposed within the internal cavity 504 of the reactor vessel 502. The improved arc saw cutting system 510 may, for example, comprise a blade mechanism 520 lowered into the internal cavity 504 of the reactor vessel 502 via a cable 522-1 coupled to an anchor 522-2 on an overhead trolley 522-3. The overhead trolley 522-3 may, in some embodiments, ride along rails 522-4 such that the blade mechanism 520 may be repositioned laterally, such as to remove the blade mechanism 520 from the reactor vessel 502 and/or to place the blade mechanism 520 in a different location (not specifically shown; e.g., an adjacent service pool) for work piece segmenting.

According to some embodiments, the cable 522-1 may be coupled to a telescoping shaft 526 of the blade mechanism 520. The telescoping shaft 526 may, in some embodiments (e.g., in the case that the blade mechanism 520 is positioned within the reactor vessel 502), be steadied and/or positioned by being coupled to a plurality of lateral supports 526-7. According to some embodiments, the lateral supports 526-7 may be coupled to or rest upon the flanged rim 502-1 of the reactor vessel 502. In some embodiments (e.g., in accordance with the various embodiments described herein), the blade mechanism 520 may comprise (and/or the telescoping shaft 526 may be coupled to) a blade drive assembly 540. The blade drive assembly 540 may, in cooperation with the telescoping shaft 526 for example, position an arc saw blade 560 (e.g., the arc saw blade 360 of FIG. 3A and/or FIG. 3B herein) to conduct segmenting of the reactor vessel 502.

In some embodiments, a control system (not shown) may be utilized to actively engage and/or control the overhead trolley 522-3, the cable 522-1, the telescoping shaft 526, and/or other components of the blade drive assembly 540 to accurately position the arc saw blade 560 for segmenting operations. The control system may comprise, for example, solid-state electronic controls and feedback mechanisms (e.g., sensors) that manage the position of the arc saw blade 560 with respect to a work piece (e.g., the reactor vessel 502). In some embodiments, the control system may maintain a gap of between eight thousandths (0.008) and sixteen thousandths (0.016) of an inch between the arc saw blade 560 and the work piece, e.g., for optimal arc saw segmenting performance as a rough-cut or "chop saw". In some embodiments, the control system may comprise at least one digital microprocessor in communication with an operator console comprising a display device and an input device, and/or may be in communication with a camera and/or other sensor device to receive feedback data regarding positioning of the arc saw blade 560.

According to some embodiments, any or all of the components 502, 502-1, 504, 506, 510, 520, 522-1, 522-2, 522-3, 522-4, 526, 526-7, 540, 560 of the nuclear reactor vessel segmenting system 500 may be similar in configuration and/or functionality to any similarly named and/or numbered components described herein. Fewer or more components 502, 502-1, 504, 506, 510, 520, 522-1, 522-2, 522-3, 522-4, 526, 526-7, 540, 560 (and/or portions thereof) and/or various configurations of the components 502, 502-1, 504, 506, 510, 520, 522-1, 522-2, 522-3, 522-4, 526, 526-7, 540, 560 may be included in the nuclear reactor vessel segmenting system 500 without deviating from the scope of embodiments described herein. In some embodiments, one or more of the various components 502, 502-1, 504, 506, 510, 520, 522-1, 522-2, 522-3, 522-4, 526, 526-7, 540, 560 may not be needed and/or desired in the nuclear reactor vessel segmenting system 500.

VII. Conclusion

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant(s) reserves the right to file additional applications to pursue patents for subject matter that has been disclosed and enabled, but not claimed in the present application.

What is claimed is:

1. An arc saw blade drive assembly, comprising:
a blade drive assembly housing coupled to a translational rail assembly; and
a circular arc saw blade comprising a center hole and coupled via a pivot pin disposed through the center hole to the blade drive assembly housing and selectively operable to be reoriented about the pivot pin from a first orientation with respect to the blade drive assembly housing to a second orientation with respect to the blade drive assembly housing, the circular arc saw blade further comprising:
(i) a solid core material sandwiched between insulation layers that comprise epoxy coatings;
(ii) a plurality of primary slits arranged about the area of the circular arc saw blade and extending radially inward from a first radial location located at a first radial distance from the center of the circular arc saw blade to a second radial location located at a second radial distance from the center of the circular arc saw blade; and
(iii) a plurality of secondary slits arranged about the area of the circular arc saw blade and extending radially inward from the second radial location to a third radial location located at a third radial distance from the center of the circular arc saw blade, and wherein each slit of the plurality of primary slits is separated from an adjacent slit of the plurality of secondary slits by being offset by a slit separation angle.

2. The arc saw blade drive assembly of claim 1, wherein the plurality of primary slits are arranged about the circumference of the circular arc saw blade such that the first radial distance comprises the radius of the circular arc saw blade.

3. The arc saw blade drive assembly of claim 1, wherein at least one of the plurality of primary slits and the plurality of secondary slits comprise a width in the range of two tenths of an inch (0.2 inches) and three tenths of an inch (0.30 inches).

4. The arc saw blade drive assembly of claim 1, wherein the solid core material comprises stainless steel and wherein the insulation layers comprise thicknesses in the range of two thousandths of an inch (0.002 inches) and five thousandths of an inch (0.005 inches).

5. An arc saw blade drive assembly for segmenting of carbon steel components, comprising:
a blade drive assembly housing coupled to a translational rail assembly; and
a circular arc saw blade comprising a center hole and coupled via a pivot pin disposed through the center hole to the blade drive assembly housing and selectively operable to be reoriented about the pivot pin from a first orientation with respect to the blade drive assembly housing to a second orientation with respect to the blade drive assembly housing, the circular arc saw blade further comprising:
(i) a solid core material of stainless steel sandwiched between insulation layers;
(ii) a plurality of primary slits arranged about the area of the circular arc saw blade and extending radially inward from a first radial location located at a first radial distance from the center of the circular arc saw blade to a second radial location located at a second radial distance from the center of the circular arc saw blade; and
(iii) a plurality of secondary slits arranged about the area of the circular arc saw blade and extending radially inward from the second radial location to a third radial location located at a third radial distance from the center of the circular arc saw blade, and wherein each slit of the plurality of primary slits is separated from an adjacent slit of the plurality of secondary slits by being offset by a slit separation angle.

6. An arc saw blade drive assembly, comprising:
a blade drive assembly housing coupled to a translational rail assembly; and
a circular arc saw blade comprising a center hole disposed at a center of the circular saw blade and the circular arc saw blade coupled via a pivot pin disposed through the center hole to the blade drive assembly housing and selectively operable to be reoriented about the pivot pin from a first orientation with respect to the blade drive assembly housing to a second orientation with respect to the blade drive assembly housing, the circular arc saw blade further comprising:
(i) a solid core material sandwiched between insulation layers;
(ii) a plurality of primary slits arranged about the area of the circular arc saw blade and extending radially inward from a first radial location located at a first radial distance from the center of the circular arc saw blade to a second radial location located at a second radial distance from the center of the circular arc saw blade; and
(iii) a plurality of secondary slits arranged about the area of the circular arc saw blade and extending radially inward from the second radial location to a third radial location located at a third radial distance from the center of the circular arc saw blade, and wherein each slit of the plurality of primary slits is separated from an adjacent slit of the plurality of secondary slits by being offset by a slit separation angle.

7. The arc saw blade drive assembly of claim 6, wherein the plurality of primary slits are arranged about the circumference of the circular arc saw blade such that the first radial distance comprises the radius of the circular arc saw blade.

* * * * *